Nov. 9, 1937.                    B. CASSEN                    2,098,275
                            X-RAY MEASURING SYSTEM
                              Filed Nov. 6, 1935
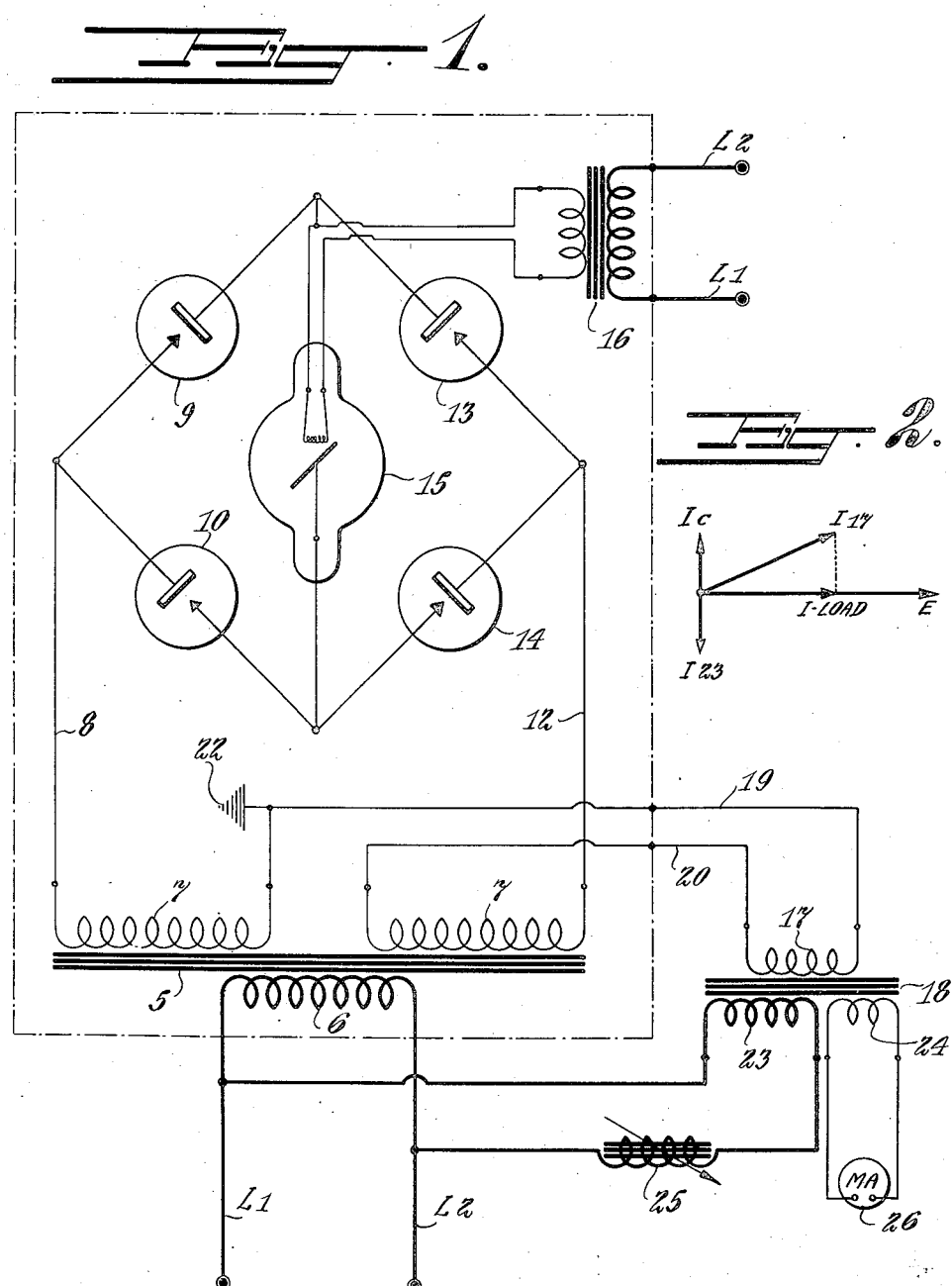
INVENTOR.
B. CASSEN.
BY M. F. Reges
ATTORNEY.

Patented Nov. 9, 1937

2,098,275

UNITED STATES PATENT OFFICE 2,098,275

X-RAY MEASURING SYSTEM

Benedict Cassen, Detroit, Mich., assignor to Westinghouse X-Ray Company Inc., a corporation of Delaware Application November 6, 1935, Serial No. 48,469

6 Claims. (Cl. 250—34)

My invention relates to X-ray systems and particularly to such systems wherein the current flowing through the high tension circuit for energizing the X-ray tube can be accurately indicated at a remote point from the high voltage system without danger of shocks resulting from the high voltage. In the prior art in order to obtain a reading in milliamperes of the current flowing through the high tension circuit it is not unusual to directly connect the indicator to the high tension circuit but this is disadvantageous for the reason that it must be remotely disposed from the usual control stand to prevent accidental shock to a patient or operator thus making it somewhat difficult to read.

To overcome this objectionable feature it has been the practice to mount the meter on the control stand and connect the same between the windings of the high voltage transformer secondary at the midpoint thereof and to connect one of the terminals to ground. While this latter system avoids any difficulty in enabling an operator to obtain a visual indication of the meter and the same is shockproof due to being connected to ground it nevertheless is likewise subjectable to objectionable features. This meter being connected directly or indirectly by means of a step down transformer, in series with the high tension secondary winding at its midpoint does not accurately record either the true useful current flowing through the X-ray tube connected to the high tension secondary winding nor is the current of the same characteristic. For example, if the system is of half wave rectification due to the imposition of a rectifying valve tube or the X-ray tube alone is utilized as a self-rectifier, the meter must necessarily be of the direct current type and during each half wave of the alternating current cycle indicates not only the true useful current or X-ray tube load but in addition the no-load current due to capacity effects of the transformer.

On the other hand if the current supplied to the X-ray tube is full wave rectification it is necessary that the indicating meter be of the alternating current type and such meter will again indicate other currents in addition to the true useful current. Moreover, in X-ray technique the technician is not interested in the discharge current but the true useful current supplied to the X-ray tube as the milliampere-seconds control the requisite dosage for the treatment of radiograph and this is determinable solely by the potential and current supplied to the tube for a definite period of time.

It is accordingly an object of my present invention to provide an X-ray system in which the true useful current supplied to the X-ray tube can be accurately and precisely indicated.

Another object of my present invention is the provision of an X-ray system wherein a meter is provided which accurately indicates the high potential discharge current flowing through the X-ray tube and which may be remotely disposed from the high tension circuit without the possibility of shocks resulting to a patient or operator.

Another object of my present invention is the provision of an X-ray system wherein the high potential discharge current flowing through the X-ray tube may be accurately indicated at a remote point from the high voltage circuit by a meter which is subjected to currents of the same characteristic as that of the true useful load flowing through the X-ray tube.

A further object of my present invention is the provision of an X-ray system wherein the X-ray tube is energized by full wave rectified high potential discharge current and in which the current flowing therethrough may be accurately indicated at a remote point from the high potential circuit without possibility of accidental shocks resulting to a patient or operator by a meter subjected to currents having the same characteristics as that of the true useful current supplied to the X-ray tube.

Still further objects of my invention will become apparent to those skilled in the art by reference to the accompanying drawing wherein, Figure 1 is a schematic diagram of an X-ray tube circuit constructed in accordance with my present invention, and Figure 2 is a vector diagram of the various currents produced in the system shown in Fig. 1.

Referring now to the drawing in detail I have shown in Figure 1 a suitable source of supply of the usual commercial potential comprising a pair of conductors L1 and L2. A high tension transformer 5 has its primary winding 6 connected to the source of supply L1 and L2 for receiving energy from the latter. The secondary winding 7 of the transformer 5 is connected by means of a conductor 8 to the cathode and anode of a pair of rectifying valve tubes 9 and 10 respectively. In a similar manner a conductor 12 connects the remaining end of the secondary winding 7 to the cathode and anode of a still further pair of rectifying valve tubes 13 and 14, respectively. An X-ray tube 15 has its cathode connected to the anodes of the respective rectifying valves 9 and 13 and the anode of the X-ray tube is connected to the respective cathodes of the rectifying valves 10 and 14.

The thermionic cathode of the X-ray tube receives heating current from a low tension transformer 16, the primary winding of which may be connected to the same commercial source of supply L1 and L2 as that to which the primary winding 6 of the high voltage transformer is connected although, for the sake of simplicity, these conductors are not shown as joined.

The thermionic cathodes of the respective valve tubes 9, 10, 13 and 14 may likewise receive heating current from a low tension source similar to that of the cathode of the X-ray tube but for the sake of simplicity none has been shown but it is to be understood that low tension transformers or batteries may be provided for this purpose.

The portion of the system so far described constitutes a conventional full wave rectified circuit for energizing the X-ray tube during the entire wave of the alternating current cycle and its operation is so well understood as to not require further explanation. In order, however, to accurately indicate the true useful or loading energy supplied to the X-ray tube the high tension secondary winding 7 is connected at its midpoint to the primary winding 17 of an auxiliary transformer 18 by means of a pair of conductors 19 and 20, one of which 19, may be grounded at 22. This auxiliary transformer 18 is provided with a plurality of secondary windings 23 and 24, one of which 23 is connected to the commercial source of supply L1 and L2 and a variable inductance element 25 is connected in series with the source of supply and the secondary winding 23. The secondary winding 24 is in turn connected to a meter 26 which records in milliamperes the true useful current flowing through the X-ray tube 15 as hereinafter described.

In the system just described the current in milliamperes in the center of the high voltage secondary winding 7, when the loading current is of the full wave rectified type, is the vector sum of the in-phase load milliamperes and out-of-phase charging milliamperes. The true useful load current supplied to the X-ray tube is always in-phase with the voltage and when graphically expressed a sinusoidal wave form of the current and voltage is substantially identical. Accordingly throughout the remainder of my specification I shall refer to this current as the true useful current or as having an in-phase current-voltage characteristic.

Also upon energization of the high voltage transformer 5 the same is subjected to what may be termed a capacity effect due to the coil to core capacity of the transformer. In this particular form of capacity the current is 90° out of phase with the voltage and consequently throughout the remainder of my specification and claims this particular capacity effect will be referred to as the no-load current or as having an out-of-phase current-voltage characteristic. When the high tension transformer 5 is energized, with the accompanying generation of both the in-phase loading current and the no-load out-of-phase current both are imposed upon the primary winding 17 of the auxiliary transformer 18. However, at the same time the high voltage transformer 5 is energized the auxiliary transformer 18 is likewise energized. The variable inductance 25 causes the energy supplied to the secondary winding 23 to have an out-of-phase current-voltage characteristic wherein the current lags the voltage and the inductance when once adjusted need not be again disturbed.

The magnetic effect of the no-load out-of-phase leading current flowing through the primary winding 17 is thus superimposed on the magnetic effect of the lagging current flowing through the secondary winding 23 which is once and for all equalized by the inductance 25 to thus neutralize or render the no-load out-of-phase leading current ineffective.

According to the voltage induced in the winding 24 by the primary winding 17 is proportional to the true useful in-phase loading current supplied to the X-ray tube with the result that the meter 26 will accurately indicate such true useful current with the no-load out-of-phase current having no effect upon the meter due to the same being neutralized or cancelled as above noted.

This may be better understood by reference to Fig. 2 wherein the vector diagram shows the various currents in the system. The horizontal line or reference vector is taken along the vector E, representing the voltage across the secondary winding 7 of transformer 5. The load component of the current is in-phase with E and is represented by I-load. The charging or no-load out-of-phase current is represented by the vector $I_c$ leading E by 90°. The resulting current flowing through the winding 17 of the auxiliary transformer 18 is shown at $I_{17}$ while the lagging current flowing through the winding 23 of such transformer is shown at $I_{23}$.

The resulting magnetic flux of winding 17 is thus seen to be in phase with the current $I_{17}$ and likewise the magnetic flux of winding 23 is in phase with $I_{23}$ which is adjusted to the same magnitude as $I_{17}$ by the inductance 25, as hereinbefore stated, giving a resultant flux in winding 24 in phase with vector sum of $I_{17}$ and $I_{23}$ and therefore in phase with I-load. Thus the leading no-load current flowing through the winding 17 is superimposed upon the lagging current of winding 23 with the resulting magnetic fluxes neutralizing the respective currents so that the resultant current induced in the winding 24 is identical to I-load, or the true useful current flowing through the X-ray tube 15 and the meter being directly connected to the winding 24 thus records such current.

It thus becomes obvious to those skilled in the art that I have provided an X-ray system wherein the true useful current flowing through an X-ray tube may be accurately and precisely recorded upon a meter which may be remotely disposed from the high tension X-ray tube excitation circuit thus rendering the meter immediately visible at all times to an operator and eliminating the possibility of shocks resulting to a patient or operator.

Although I have shown and described one specific embodiment of my invention I do not desire to be limited thereto as various other modifications of the same may be made without departing from the spirit and scope of the appended claims.

What is claimed:

1. In an X-ray system, the combination of an X-ray tube, a high potential source of alternating current electrical energy connected to said X-ray tube for energizing the same with the loading energy supplied to said X-ray tube having an in-phase current-voltage characteristic and said source also having a no-load out-of-phase current voltage characteristic, means connected to said source and to said X-ray tube to cause only unidirectional electrical energy to be supplied to said X-ray tube, means electrically connected to said high potential source for neutralizing the no-load out-of-phase current-voltage characteristic thereof so that the energy supplied to said last mentioned means is proportional to the loading energy supplied to said X-ray tube, and means connected to said last mentioned means for indicating only the current supplied to the latter which is representative of the useful current actually supplied to said X-ray tube.

2. In an X-ray system, the combination of an X-ray tube, a transformer for generating high potential alternating current electrical energy for energizing said X-ray tube with the loading energy supplied thereto having an in-phase current-voltage characteristic and said transformer also being subjected to a no-load out-of-phase current-voltage characteristic, rectifying means interposed between said transformer and said X-ray tube to cause only unidirectional electrical energy to be supplied to said X-ray tube, an auxiliary transformer having its primary winding connected to said high potential transformer and subjected to the same current-voltage characteristics as the latter, a source of electrical energy including means for generating an out-of-phase current-voltage characteristic connected to the secondary winding of said auxiliary transformer for neutralizing the out-of-phase characteristic imposed on said auxiliary transformer by said high tension transformer in order that the only energy induced in said auxiliary transformer is proportional to the loading energy of said X-ray tube, and a meter connected to another secondary winding of said auxiliary transformer for indicating only the current supplied to the latter and consequently the actual useful current supplied to said X-ray tube.

3. In an X-ray system, the combination of an X-ray tube, a transformer for generating high potential alternating current electrical energy for energizing said X-ray tube with the loading energy supplied thereto having an in-phase current voltage characteristic and said transformer also being subjected to a no-load out-of-phase current-voltage characteristic wherein the current leads the voltage, a plurality of thermionic rectifying valves interposed between said transformer and said X-ray tube to cause only unidirectional electrical energy to be supplied to said X-ray tube, a low tension transformer having its primary winding connected to said high tension transformer and subjected to the same current-voltage characteristics as the latter, a source of electrical energy including means for generating an out-of-phase current-voltage characteristic wherein the current lags the voltage and connected to a secondary winding of said low-tension transformer for neutralizing the out-of-phase characteristic imposed thereon by said high tension transformer in order that the only energy induced in said auxiliary transformer is proportional to the loading energy of said X-ray tube, and an indicating meter connected to another secondary winding of said low tension transformer for indicating only the actual useful load current supplied to said X-ray tube.

4. In an X-ray system, the combination of an X-ray tube, a transformer for generating high potential alternating current electrical energy for energizing said X-ray tube with the loading energy supplied thereto having an in-phase current-voltage characteristic and said transformer also generating a no-load out-of-phase current-voltage characteristic, rectifying means interposed between said transformer and said X-ray tube to cause only unidirectional electrical energy to be supplied to said X-ray tube, a low-tension transformer having its primary winding connected to said high tension transformer and subjected to the same current-voltage characteristics as the latter and provided with a plurality of secondary windings, a source of electrical energy including means for generating an out-of-phase current-voltage characteristic and connected to one of said secondary windings for neutralizing the out-of-phase characteristic imposed on said low tension transformer by said high tension transformer, and an indicating meter connected to the other secondary winding of said low tension transformer for indicating the energy induced therein which is proportional to the actual useful load current supplied to said X-ray tube.

5. In a system for accurately measuring the useful load current in an X-ray tube, the combination of an X-ray tube, a high tension transformer having a secondary winding for generating high potential alternating current electrical energy for energizing said X-ray tube with the loading energy supplied thereto having an in-phase current-voltage characteristic and said transformer also having a no-load out-of-phase current-voltage characteristic, rectifying means interposed between said transformer and said X-ray tube to cause only unidirectional electrical energy to be supplied to said X-ray tube, a low-tension transformer having its primary winding connected to the center of the secondary winding of said high tension transformer and subjected to the same current-voltage characteristics as the latter and provided with a plurality of secondary windings, a source of electrical potential connected to one of the secondary windings of said low tension transformer, means interposed between said last mentioned source and the secondary winding to which it is connected and operable to cause said source to impose an out-of-phase current-voltage characteristic upon said secondary winding to neutralize the effect of the out-of-phase current-voltage characteristic imposed upon the primary winding of said low tension transformer, and a meter connected to the other secondary winding of said low tension transformer for indicating the current induced therein which is proportional to the actual useful load current supplied to said X-ray tube.

6. In a system for accurately measuring the useful load current in an X-ray tube, the combination of an X-ray tube, a high tension transformer having a secondary winding for generating high potential alternating current electrical energy for energizing said X-ray tube with the loading energy supplied thereto having an in-phase current-voltage characteristic and said transformer also having a no-load out-of-phase current voltage characteristic wherein the current leads the voltage, rectifying means interposed between said transformer and said X-ray tube to cause only unidirectional electrical energy to be supplied to the latter, a low tension transformer having its primary winding connected to the center of the secondary winding of said high tension transformer and subjected to the same current-voltage characteristics as the latter and provided with a pair of secondary windings, a source of electrical potential connected to one of the secondary windings of said low tension transformer, an inductance element interposed between said last mentioned source and the secondary winding to which it is connected and operable to cause said source to impose an out-of-phase current-voltage characteristic upon said secondary winding wherein the current lags the voltage for the purpose of neutralizing the effect of the leading current-voltage characteristic imposed upon the primary winding of said low tension transformer by said high tension transformer, and an indicating meter connected to the other secondary winding of said low tension transformer and operable to indicate the current induced in said secondary winding which is proportional to the actual useful load current supplied to said X-ray tube and consequently accurately indicates the latter.

BENEDICT CASSEN.